United States Patent [19]

Cook

[11] Patent Number: 4,964,706
[45] Date of Patent: Oct. 23, 1990

[54] MULTI-FOCAL LENGTH, MULTI-FIELD OF VIEW THREE MIRROR ANASTRIGMAT

[75] Inventor: Lacy G. Cook, El Segundo, Calif.

[73] Assignee: Hughes Aircraft Company, Los Angeles, Calif.

[21] Appl. No.: 259,012

[22] Filed: Oct. 17, 1988

[51] Int. Cl.⁵ .................. G02B 17/06; G02B 23/06; G02B 5/10; G02B 7/18
[52] U.S. Cl. .................. 350/505; 350/620; 350/558
[58] Field of Search ............... 350/505, 504, 503, 620, 350/619, 558, 442, 443

[56] References Cited

U.S. PATENT DOCUMENTS 4,812,030 3/1989 Pinson .................. 350/620

Primary Examiner—Jon W. Henry
Attorney, Agent, or Firm—William J. Streeter; Wanda K. Denson-Low

[57] ABSTRACT

A three-mirror anastigmat system has a plurality of focal lengths, fields of view or both reflected to its focal planes. The system includes a positive power primary mirror (10) and a negative power secondary mirror (12) transmitting an image of an object to be viewed to a plurality of tertiary mirrors (14 and 16) operating at various magnifications. The tertiary mirrors (14 and 16) provide the plurality of images with different or the same focal lengths and fields of view to the plurality of focal planes (22 and 24).

18 Claims, 3 Drawing Sheets

MULTI-FOCAL LENGTH, MULTI-FIELD OF VIEW THREE MIRROR ANASTRIGMAT

BACKGROUND

1. Technical Field

This invention relates to reflective telescope systems and, more particularly, to an all-reflective multi-focal length, multi-field of view three-mirror anastigmat.

2. Discussion

The performance of a conventional high quality telescope when used on the earth for celestial viewing is principally limited to the earth's atmosphere rather than by the construction of the telescope. Atmospheric effects not only limit the resolution of telescopes, but also absorb large portions of the electromagnetic spectral range. While in the past, very little could be done about this limitation, today, with the help of earth satellites and other space vehicles, it is possible to place a telescope above the atmosphere and perform extraterrestrial observations without interference from it. As a result, there has arisen a need for telescope which can more fully take advantage of this new environment. Also, it should be understood that the present inVention may be utilized for other airborne or ground based applications that require viewing distant objects.

One such telescope is that disclosed in U.S. Pat. No. 4,101,195, issued to Korsch. This reference discloses an anastigmatic three-mirror telescope. The telescope has a primary and secondary configuration similar to a Cassegrain design which forms a real image closely behind the primary mirror. The image is then relayed or reimaged by a tertiary mirror at approximately unit magnification to a flat plane for viewing, the plane being parallel to or displaced from the axis of the primary and secondary mirrors. To achieve this, a plane mirror, which functions as a fold mirror, is positioned at an angle of 45° with respect to the image formed by the primary-secondary mirrors and either directs light from the secondary mirror to the tertiary mirror or reflects light from the tertiary mirror to a final image plane.

SUMMARY OF THE INVENTION

According to the teachings of the present invention, a system is provided which enables a single telescope to provide a plurality of different focal lengths, fields of view or both. The present invention provides for the attainment of a plurality of radically different images at the same time. The present invention enables entirely different types of wavelengths to be sensed by the same or entirely different types of electronic imaging sensing devices. Thus, in a practical sense, the present invention may provide a coarse resolution image of an object being viewed to a certain kind of detector, such as infrared, and simultaneously view a much smaller portion of the scene at high resolution, which is entirely in a different wavelength, by another detector, such as visible.

The present invention also provides excellent image resolution and sharpness. For example, with an aperture opening of F/22 with a 0.15° line field of view, the geometrical 80% blur diameters across the field of view are reasonably uniform and average about 0.1 to 0.2 microradians. For an aperture opening of F/14 with a 0.5 degree line field of view, the aberration residuals as represented by the geometrical 80% blur diameter average about 1.0 to 2.0 microradians across the field of view.

In the preferred embodiment, the three-mirror anastigmat system is comprised of the following. A primary mirror having a central axis. A secondary mirror facing the primary mirror. The secondary mirror is of a smaller diameter than the primary mirror and is positioned substantially symmetrically with the central axis of the primary mirror such that light from a viewed object passes around and by the secondary mirror. Further, the system includes a mechanism for reflecting a plurality of images of the object being viewed to a plurality of planes for viewing. The reflecting mechanism is positioned to receive light from the secondary mirror. Also, the reflecting mechanism provides the plurality of images with different focal lengths, fields of view, or both to the plurality of viewing planes.

BRIEF DESCRIPTION OF THE DRAWINGS

The various advantages of the present invention will become apparent to those skilled in the art after a study of the following specification and by reference to the drawings in which.

DESCRIPTION OF THE PREFERRED EMBODIMENT

Figure 1:
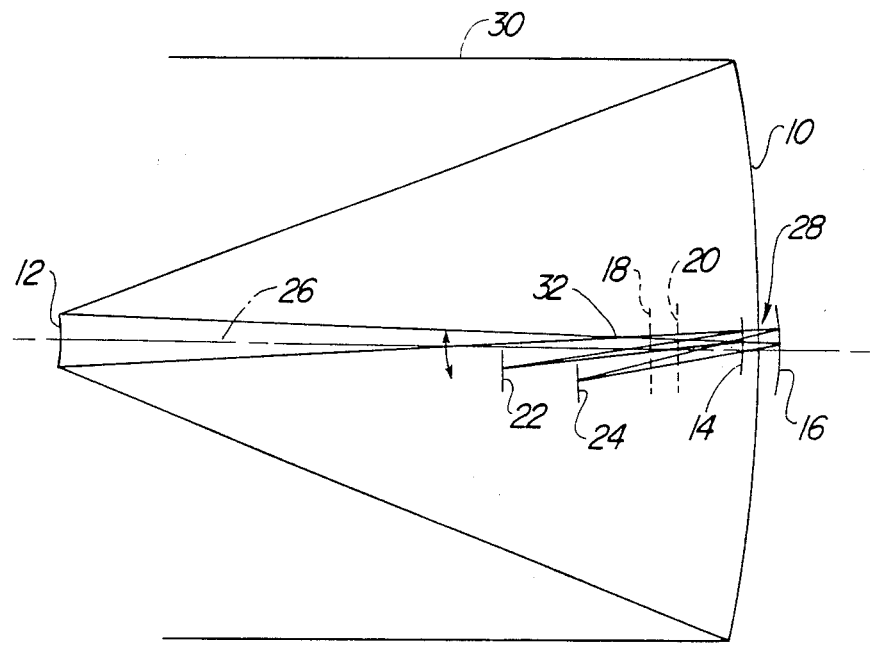
FIG. 1 is a schematic diagram of an along-scan view of a three-mirror anastigmat system in accordance with the present invention.

Turning to the Figures, a three-mirror anastigmat system is illustrated including a primary mirror 10, a secondary mirror 12, and two or more tertiary mirrors 14 and 16. The three-mirror system also includes two or more aperture stops 18 and 20, and two or more focal planes 22 and 24. Also, the system would include a plurality of planar fold mirrors (not shown) which would receive and reflect the light beams to or from the desired tertiary mirrors.

The primary mirror 10 defines a central axis 26 and may have a central aperture 28. The primary mirror 10 is a positive power mirror and is generally an ellipsoid mirror although it could be a higher order aspheric mirror.

The secondary mirror 12 has a diameter smaller than the primary mirror 10 and is positioned substantially symmetrically on the central axis 26. The secondary mirror 12 is a negative power mirror and is generally a hyperboloid conic mirror although it could be a higher order aspheric mirror.

The tertiary mirrors 14 and 16 are positive power mirrors. The tertiary mirrors 14 and 16 may be ellipsoid conic mirrors although they could be higher order aspheric mirrors. Generally, the base radii of the tertiary mirrors 14 and 16 are substantially the same. However, the higher order departures or higher order aspheric figures may be different to modify the characteristics of the system. With having their base radii substantially the same, the Petzval sum of the system may be manipulated to be substantially zero at both focal planes.

Figure 2:
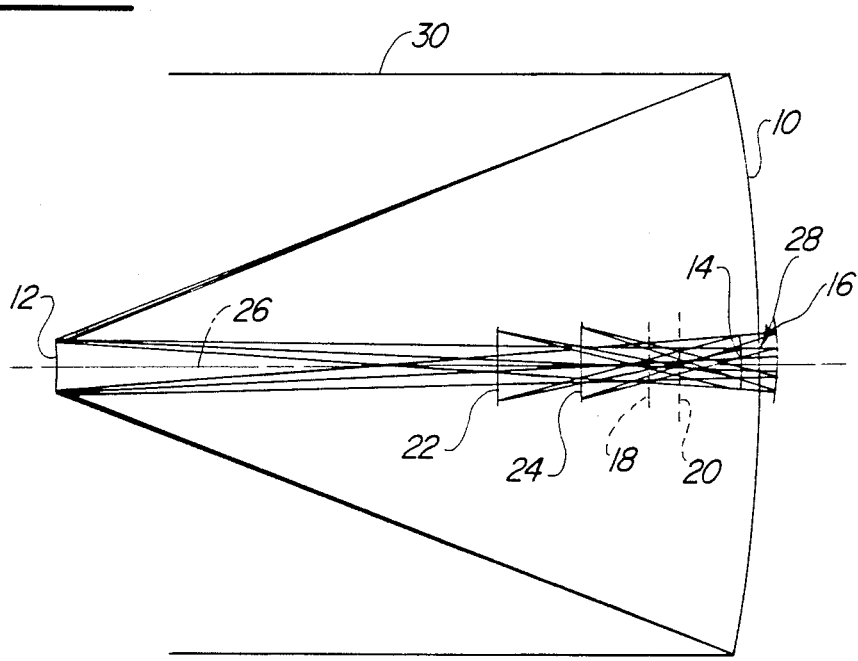
FIG. 2 is a schematic diagram of a cross-scan view of the system of FIG. 1.

In FIGS. 1 and 2, light beams 30 transmit an image of an object to be viewed to the primary mirror 10. The beams 30 are reflected from the primary mirror 10 to the secondary mirror 12. The secondary mirror 12 receives and reflects the light beams 30 to the tertiary mirrors 14 and 16. The light beams 30 may be received by and reflected from planar fold mirrors prior to being reflected to the tertiary mirrors 14 and 16. Also, planar fold mirrors may receive and reflect the light beams after the beams reflect from the tertiary mirrors 14 and 16.

As the light beams 30 pass toward the tertiary mirrors 14 and 16, an intermediate image is formed at 32. The intermediate image of the light beams 30 is reflected from the tertiary mirrors 14 and 16 through aperture stops 18 and 20, respectfully, and reimages the intermediate image at focal planes 22 and 24. An electronic sensing device (not shown) such as an electronic detector array, or the like, is positioned at each of the focal planes 22 and 24 to receive the real images. Each focal plane receives an image at a different focal length. Also, each focal plane has a different field of view. This being the case, different electronic sensing devices may be positioned at each focal plane so that a different image may be sensed at each focal plane. For example, infrared detectors may be used as the electronic sensing device and provide a large scene with coarse resolution of the object being viewed. Simultaneously, a small portion of the same scene may be viewed with fine resolution by a visible detector. Thus, the system provides for simultaneous viewing of an object at different focal lengths, resolutions, and fields of view, and different detectors may be used at each focal plane.

Figure 3:
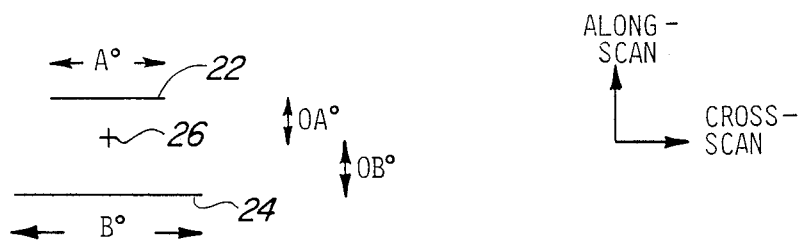
FIG. 3 is a schematic diagram of the lateral or transverse positioning of the focal plane of the system of FIGS. 1 and 2.
Figure 4:
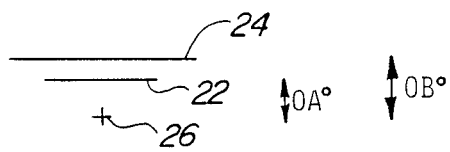
FIG. 4 is another embodiment of a schematic diagram of the lateral or transverse positioning of the focal plane of the system of FIGS. 1 and 2.

Turning to FIGS. 1 and 2, the FIGS. illustrate an along-scan and cross-scan view of an F/22 and F/14 design with 0.15° and 0.5°, respectfully, line field of view. As can be seen in FIGS. 3 and 4, the line field of view can be on different sides of the optical axis, as seen in FIG. 3 or on the same side of the optical axis, as seen in FIG. 4. Depending upon the particular system and the particular design, the field of view may be on either the same side or opposite sides of the optical axis.

The F/22 design with a 0.15° line field of view has its tertiary mirror 14 located to the left of the primary mirror 10 vertex. This tertiary mirror is utilized at about 2:1 magnification. The geometrical 80% blur diameters across the field of view are reasonably uniform and average about 0.1 to 0.2 microradians.

The F/14 design with a 0.5° line field of view has its tertiary mirror 16 located to the right of the primary mirror 10 vertex. This tertiary mirror is utilized at about 1:1 magnification. Aberration residuals as represented by geometrical 80% blur diameters average about 1.0 to 2.0 microradians across the line field of view.

In order to move the final image away from the intermediate image and to provide access to the aperture stops, it is necessary to offset the field of view in the along-scan direction. In FIGS. 1 and 2, the focal plane 22 is offset about 0A° while the focal plane 24 is offset about 0B°. This difference in field offset ensures a complete separation of the two line field of views in the region of the intermediate image designated at 32. The separation of images further allows the use of a plurality of fold mirrors to separate the subsequent portions of the two optical systems and package them as desired. If tilts or decenters are not employed on the primary or secondary mirrors, the two fields can be operated on either the same or opposite sides of the optical axis as illustrated in FIGS. 3 and 4. The angular separation can be as much as 0A°+0B° or as little as 0B°−0A°. The utility and/or packaging constraints dictate one or the other configurations.

The present system may be utilized with systems like those disclosed in U.S. patent Ser. No. 259,013, filed the same day as the present application, entitled "Continuous Zoom All-Reflective Optical System," assigned to the same assignee of the present application, the specification of which is herein expressly incorporated by reference.

A specific prescription for the system in accordance with the present invention is as follows.

| # | Description | Radius | Conic Constant | d | e | f | g | Decenter | Tilt | Thickness |
|---|---|---|---|---|---|---|---|---|---|---|
| 10 | Primary Mirror | −130.000 | −0.99638 | — | — | — | — | — | — | −59.1957 |
| 12 | Secondary Mirror | −13.2455 | −1.5850 | — | — | — | — | — | — | 58.1958 |
| 14 | Tertiary Mirror | −14.9486 | −0.65629 | $-0.1465 \times 10^{-4}$ | $0.7056 \times 10^{-5}$ | $-0.1313 \times 10^{-5}$ | $0.9380 \times 10^{-7}$ | 0.07184 | — | −22.3373 |
| 22 | Focal Plane | ∞ | — | — | — | — | — | — | — | — |
| 12 | Secondary Mirror | −13.2455 | −1.5850 | — | — | — | — | — | — | 60.1411 |
| 16 | Tertiary Mirror | −14.6245 | −1.4734 | $-0.2758 \times 10^{-4}$ | $-0.6424 \times 10^{-6}$ | $-0.6058 \times 10^{-7}$ | $-0.1962 \times 10^{-8}$ | −0.2848 | −0.0969 | −16.3847 |
| 24 | Focal Plane | ∞ | — | — | — | — | — | — | — | — |

[(+) Thicknesses are to the right; (+) Radii have centers to the right; (+) Decenters are up; (+) Tilts are counter clockwise; Decenters done before tilts]

Surface Figure Departures According to the Equation:

$$Z = \frac{c\rho^2}{1 + \sqrt{1 - (K+1)c^2\rho^2}} + d\rho^4 + e\rho^6 + f\rho^8 + g\rho^{10}$$

Where:
 Z = Surface SAD
 C = 1/RD
 K = CC = Conic Constant = −(Eccentricity)$^2$
 $\rho^2 = x^2 + y^2$ Using Tertiary Mirror (14)

48 Entrance Pupil Diameter
 1056 Effective Focal Length
 F/22 Optical Speed
 0.15° Line Field of View
 0.125° Field Offset Using Tertiary Mirror (16)

Figure 5:
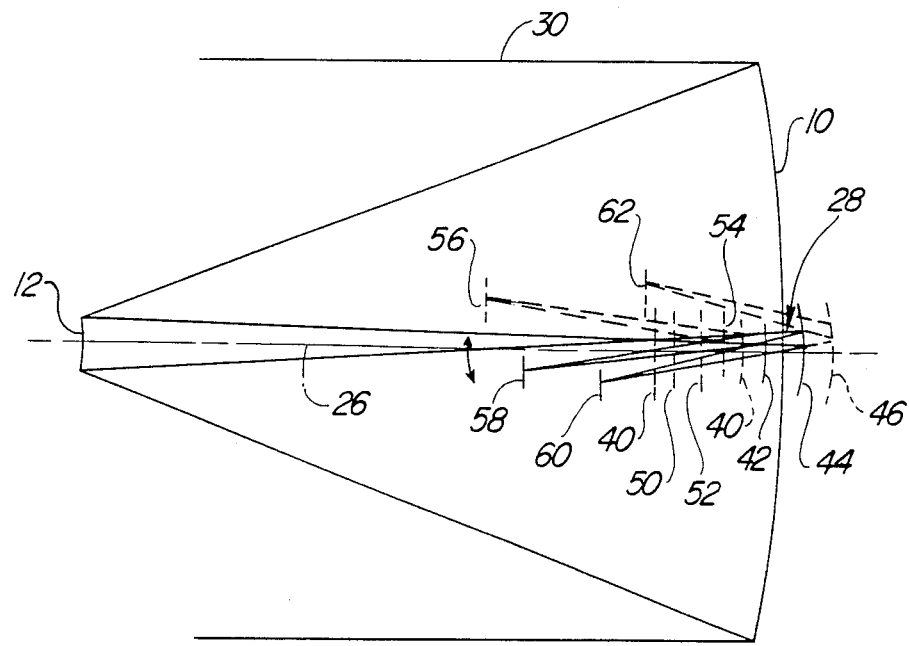
FIG. 5 is another embodiment of a schematic diagram of an along-scan view of a three-mirror anastigmat system in accordance with the present invention.
Figure 6:
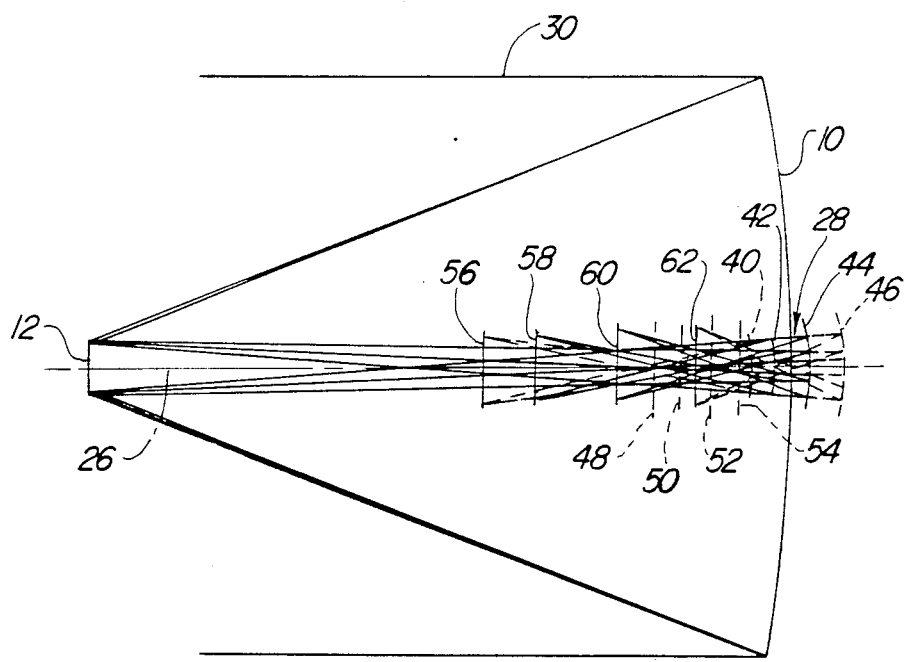
FIG. 6 is a schematic diagram of a cross-scan view of the system of FIG. 5.

48 Entrance Pupil Diameter
672 Effective Focal Length
F/14 Optical Speed
0.50° Line Filed of View
−0.125° Field Offset Moving to FIGS. 5 and 6, a second embodiment of the present invention is shown. In FIGS. 5 and 6, the primary 10 and secondary 12 mirrors are substantially the same. However, a plurality of tertiary mirrors 40, 42, 44, and 46 are illustrated. The system includes aperture stops 48, 50, 52, 54 and focal planes 56, 58, 60 and 62. This design illustrates the use of at least four tertiary mirrors. As stated above, the same or different electronic sensing devices may be placed at each of the focal planes to view different fields of view at different focal lengths.

The present system provides a telescope having a plurality of fixed tertiary mirrors which may resolve a one meter target 1 million to 10 million meters away. Thus, the system will not be limited by the image quality, however, it may be limited by the electronic sensors or physics of diffraction of the front aperture.

One application of the present invention in an operational aerospace system may be as follows. For instance, it might be desirable to view a large scene with coarse resolution in an infrared image. Thus, an infrared detector may be positioned at a focal plane corresponding to a tertiary mirror with a wider field of view and shorter focal length. Simultaneously, a view of a small portion of that scene, at an entirely different wavelength, with an entirely different imaging device may be desired. The second imaging device may be a visible device. The visible detector would be positioned at a focal plane corresponding to a tertiary mirror with a longer focal length and narrower field of view. Thus, both infrared and visible images would be transmitted simultaneously to a screen or the like from the same telescope.

It should be understood that while this invention has been described in connection with a particular example hereof, that various modifications, alterations, and variations of the disclosed preferred embodiment may be made after having the benefit of a study of the specification, drawings and the following claims.

What is claimed is:

1. A three mirror anastigmat system comprising:
    a primary mirror having a central axis;
    a secondary mirror facing said primary mirror, said secondary mirror being of a smaller diameter than said primary mirror and positioned substantially symmetrically about said central axis of said primary mirror such that light from a viewed object passes around and by said secondary mirror and is reflected by said secondary mirror; and
    reflecting means for simultaneously reflecting light from the object being viewed to a plurality of planes for viewing, said reflecting means being positioned to receive light from said secondary mirror, said reflecting means including a plurality of tertiary mirrors of finite focal length and said plurality of tertiary mirrors forming a plurality of images of the object being viewed on said plurality of viewing planes.

2. The system according to claim 1 wherein said primary mirror has positive power.

3. The system according to claim 1 wherein said primary mirror includes an opening central about said central axis.

4. The system according to claim 1 wherein said secondary mirror has negative power.

5. The system according to claim 1 wherein said plurality of tertiary mirrors have positive power.

6. The system according to claim 1 wherein said plurality of tertiary mirrors have substantially the same base radius.

7. The system according to claim 6 wherein said plurality of tertiary mirrors have different higher order departures.

8. A three mirror anastigmat system comprising:
    a primary mirror having a central axis;
    a secondary mirror facing said primary mirror, said secondary mirror being of a smaller diameter than said primary mirror and positioned substantially symmetrically about said central axis of said primary mirror such that light from a viewed object passes around and by said secondary mirror and is reflected by said secondary mirror; and
    reflecting means for simultaneously reflecting light from the object being viewed to a plurality of planes for viewing, said reflecting means being positioned to receive light from said secondary mirror, said reflecting means including a plurality of tertiary mirrors of finite focal length and said plurality of tertiary mirrors forming a plurality of images of the object being viewed on said plurality of viewing planes.

9. The system according to claim 9 wherein said primary mirror has positive power.

10. The system according to claim 9 wherein said primary mirror includes an opening central about said central axis.

11. The system according to claim 8 wherein said secondary mirror has negative power.

12. The system according to claim 8 wherein said plurality of tertiary mirrors have positive power.

13. The system according to claim 8 wherein said plurality of tertiary mirrors have substantially the same base radius.

14. The system according to claim 13 wherein said plurality of tertiary mirrors have different higher order departures.

15. A three powered mirror anastigmat system comprising:
    a positive power primary mirror having a central axis;
    a negative power secondary mirror facing said positive primary mirror, said secondary mirror being of a smaller diameter than said primary mirror and positioned substantially symmetrically about said central axis of said primary mirror such that light from a viewed object passes around and by said secondary mirror and is reflected by said secondary mirror; and
    reflecting means for simultaneously reflecting light from the object being viewed to a plurality of planes for viewing, said reflecting means being positioned to receive light from said secondary mirror, said reflecting means including a plurality of tertiary mirrors of finite focal length and said plurality of tertiary mirrors forming a plurality of images of the object being viewed on said plurality of viewing planes.

16. The system according to claim 15 wherein said plurality of tertiary mirrors are positive power.

17. The system according to claim 16 wherein said plurality of tertiary mirrors have substantially the same base radius.

18. The system according to claim 17 wherein said plurality of tertiary mirrors have different higher order departures.

* * * * *